United States Patent
Heirich

(10) Patent No.: US 9,524,541 B2
(45) Date of Patent: Dec. 20, 2016

(54) METHOD AND APPARATUS FOR IMAGE FILTER TUNING

(71) Applicant: HERE Global B.V., LB Veldhoven (NL)

(72) Inventor: Alan Heirich, Half Moon Bay, CA (US)

(73) Assignee: HERE GLOBAL B.V., Eindhoven (NL)

( * ) Notice: Subject to any disclaimer, the term of this patent is extended or adjusted under 35 U.S.C. 154(b) by 334 days.

(21) Appl. No.: 14/172,390

(22) Filed: Feb. 4, 2014

(65) Prior Publication Data
US 2015/0220813 A1 Aug. 6, 2015

(51) Int. Cl.
*G06K 9/00* (2006.01)
*G06T 5/40* (2006.01)
*G06T 5/00* (2006.01)

(52) U.S. Cl.
CPC ............... *G06T 5/40* (2013.01); *G06T 5/009* (2013.01); *G06T 2207/20081* (2013.01)

(58) Field of Classification Search
CPC    G06K 9/00476; G06K 9/4642; G06K 9/4652; G06K 9/6212; G06K 9/6255; G06K 9/6256; G06K 9/6262; G06K 9/38; G06K 9/4647; G06K 2017/077; G06T 5/009; G06T 5/40; G06T 7/408; G06T 2207/10016; G06T 2207/20012; G06T 2207/20081; G06T 7/403; H04N 1/4074; H04N 5/217; H04N 5/23229; H04N 5/2351; G06F 17/3079; G06F 17/30802
See application file for complete search history.

(56) References Cited

U.S. PATENT DOCUMENTS

| | | | | |
|---|---|---|---|---|
| 7,796,812 | B2 * | 9/2010 | Pitie | H04N 1/4074 382/162 |
| 9,055,227 | B2 * | 6/2015 | Batur | H04N 5/217 |
| 2010/0290716 | A1 * | 11/2010 | Mori | G06K 9/6255 382/309 |
| 2015/0269717 | A1 * | 9/2015 | Umit | H04N 5/217 382/155 |

OTHER PUBLICATIONS

"Kernel-Machines.Org", Kernel Machines, Retrieved on Apr. 11, 2014, Webpage available at : http://www.kernel-machines.org/.
Munshi et al., "OpenCL Programming Guide", Addison-Wesley, Jul. 2011, 648 pages.
Brownlee et al., "Linear Regression", Clever Algorithms: Statistical Machine Learning Recipes, 2012, 51 pages.
Apple Inc., "Aperture 3.x: Working with the Auto Enhance Button", Apple.com, May 31, 2013, 3 pages, retrieved from <http://support.apple.com/kb/PH7494> on Dec. 12, 2013.

(Continued)

*Primary Examiner* — Jose Couso
(74) *Attorney, Agent, or Firm* — Alston & Bird LLP

(57) ABSTRACT

Disclosed herein is a method. A set of pre-adjusted images including source images of the pre-adjusted images is provided. The pre-adjusted images include image filter parameters. Histogram information for each of the source images is computed. A learning algorithm is applied to the set. The learning algorithm is configured to map the histogram information to the image filter parameters. A real-time image is processed based on the mapping of the histogram information to the image filter parameters.

19 Claims, 5 Drawing Sheets

(56) References Cited

OTHER PUBLICATIONS

Bychkovsky, Vladimir, et al., "Learning Photographic Global Tonal Adjustment with a Database of Input / Output Image Pairs", *Proceedings of CVPR, IEEE Computer Society Conference on Computer Vision and Pattern Recognition*, Jul. 2011, pp. 97-104, retrieved from <http://people.csail.mit.edu/vladb/photoadjust/db_imageadjust.pdf>on Jun. 29, 2016.

Wikipedia Contributors, "Support Vector Machine", *Wikipedia, The Free Encyclopedia*, Nov. 16, 2013, 12 pages, retrieved from <https://en.wikipedia.org/w/index.php?title=Support vector_machine&oldid=581936028> on Jun. 29, 2016.

\* cited by examiner

METHOD AND APPARATUS FOR IMAGE FILTER TUNING

TECHNICAL FIELD

The invention relates to image filter tuning and, more particularly, to fast automatic image filter tuning using machine learning algorithms.

BACKGROUND

As electronic devices continue to become more sophisticated, these devices provide an increasing amount of functionality and features. One area gaining popularity in the consumer market is improved camera functionality and features. In particular, automated methods for selecting parameter values may not exist in the general case, and if they do exist they may be very computationally expensive and impractical for a mobile device.

As consumers demand increased functionality from electronic devices, there is a need to provide improved devices having increased capabilities while maintaining robust and reliable product configurations.

SUMMARY

Various aspects of examples of the invention are set out in the claims.

In accordance with one aspect of the invention, a method is disclosed. A set of pre-adjusted images including source images of the pre-adjusted images is provided. The pre-adjusted images include image filter parameters. Histogram information for each of the source images is computed. A learning algorithm is applied to the set. The learning algorithm is configured to map the histogram information to the image filter parameters. A real-time image is processed based on the mapping of the histogram information to the image filter parameters.

In accordance with another aspect of the invention, an apparatus is disclosed. The apparatus includes at least one processor, and at least one memory including computer program code. The at least one memory and the computer program code configured to, with the at least one processor, cause the apparatus to perform at least the following. Provide a set of pre-adjusted images including source images of the pre-adjusted images, wherein the pre-adjusted images include image filter parameters. Compute histogram information for each of the source images. Apply a learning algorithm to the set, wherein the learning algorithm is configured to map the histogram information to the image filter parameters. Process a real-time image based on the mapping of the histogram information to the image filter parameters.

In accordance with another aspect of the invention, a computer program product including a computer-readable medium bearing computer program code embodied therein for use with a computer is disclosed. The computer program code includes: Code for providing a set of pre-adjusted images including source images of the pre-adjusted images. The pre-adjusted images include image filter parameters. Code for computing histogram information for each of the source images. Code for applying a learning algorithm to the set. The learning algorithm is configured to map the histogram information to the image filter parameters. Code for processing a real-time image based on the mapping of the histogram information to the image filter parameters.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
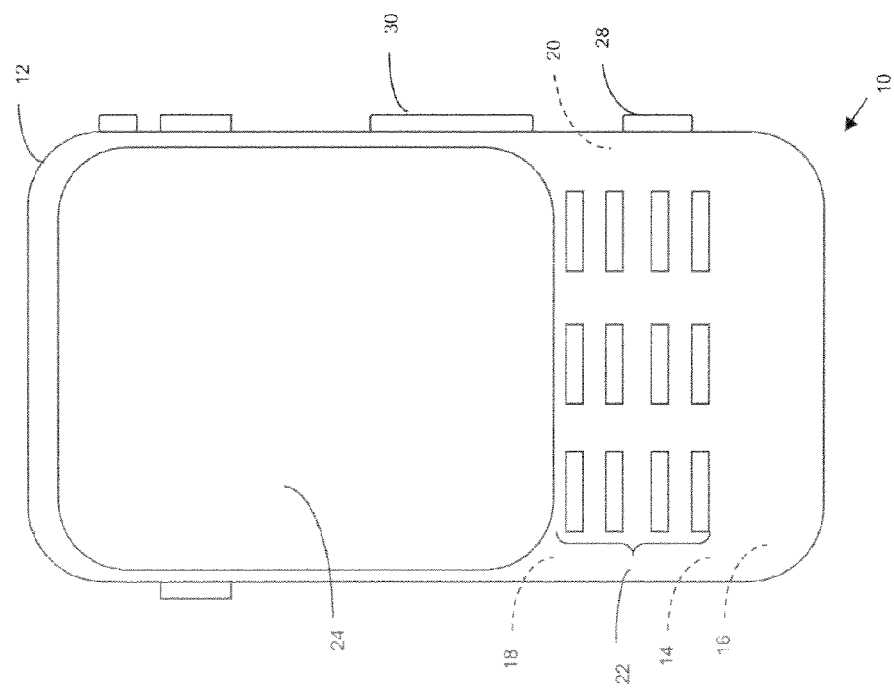
FIG. 1 is a front view of an electronic device incorporating features of the invention.

Referring to FIG. 1, there is shown a front view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a digital camera, a mobile phone, a gaming device, a music player, a notebook computer, or a personal digital assistant, for example. In addition, as is known in the art, the device 10 can include multiple features or applications such as a camera, a music player, a game player, or an Internet browser, for example. The device 10 generally comprises a housing 12, a transmitter 14, a receiver 16, an antenna 18 (connected to the transmitter 14 and the receiver 16), electronic circuitry 20, such as a controller (which could include a processor, for example) and a memory for example, within the housing 12, a user input region 22 and a display 24. It should be understood that although the user input region 22 is illustrated as a keypad, various exemplary embodiments of the invention may include touch-screen technology at the user input region 22. The display 24 could also form a user input section, such as a touch screen. It should be noted that in alternate embodiments, the device 10 can have any suitable type of features as known in the art.

Figure 2:
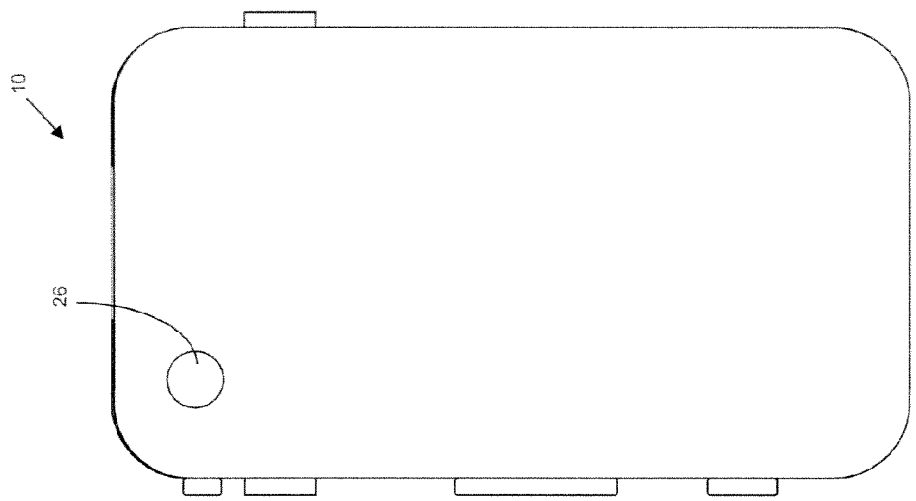
FIG. 2 is a rear view of the electronic device shown in FIG. 1.

Referring now also to FIG. 2, the electronic device 10 further comprises a camera 26 which is shown as being rearward facing (for example for capturing images and/or video) but may alternatively or additionally be forward facing (for example for video calls). The camera may be controlled by a shutter actuator 28 and optionally by a zoom actuator 30. However, any suitable camera control functions and/or camera user inputs may be provided.

Figure 3:
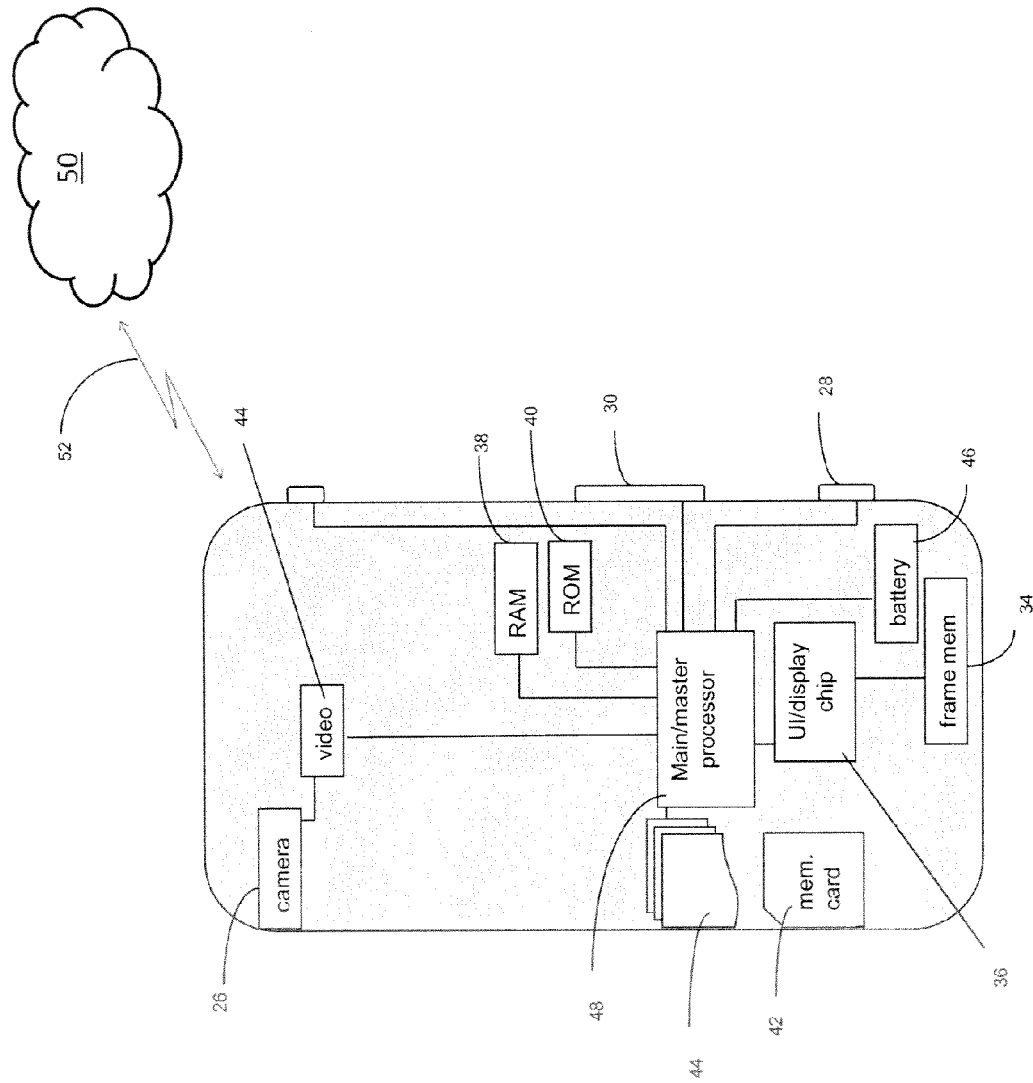
FIG. 3 is a schematic drawing illustration various internal components of the electronic device shown in FIG. 1.

Referring now also to FIG. 3, signals to and from the camera 26 pass through an image/video processor 32 which encodes and decodes the various image frames. The graphical display interface 24 is refreshed from a frame memory 34 as controlled by a user interface chip 36 which may process signals to and from the display interface 24 and/or additionally process user inputs from the keypad 22 and elsewhere.

Throughout the apparatus are various memories such as random access memory RAM 38, read only memory ROM 40, and in some embodiments removable memory such as the illustrated memory card 42. Various programs 44 are stored in one or more of these memories. All of these components within the device 10 are normally powered by a portable power supply such as a battery 46.

The aforesaid processors 32, 36, if embodied as separate entities in the device 10, may operate in a slave relationship to the main processor 48 which may then be in a master relationship to them. Embodiments of this invention are most relevant to the image/video processor (or graphics processing unit [GPU]) 32, though it is noted that other embodiments need not be disposed there but may be disposed across various chips and memories as shown or disposed within another processor that combines some of the functions described above. Any or all of these various processors may access one or more of the various memories, which may be on-chip with the processor or separate therefrom.

Note that the various chips that were described above may be combined into a fewer number than described and, in a most compact case, may all be embodied physically within a single chip.

It should further be noted that certain embodiments of the device 10 may also include one or more secondary radios such as a wireless local area network radio WLAN and a Bluetooth® radio, which may incorporate an antenna on-chip or be coupled to an off-chip antenna. Additionally, the device 10 may be generally configured to provide connectivity with a network 50 (see link 52), such as a telephone network and/or a data communications network (e.g., the internet, cloud server(s) [cloud], any suitable cloud computing configuration, for example).

According to various exemplary embodiments of the invention, improvements in image processing for digital cameras is provided. The digital camera may take a sequence of still or video images that are stored electronically. Software algorithms called image filters may be used to process these images to apply a variety of visual effects. For example image filters can be used to brighten or darken an image, to change the color balance, to decorate features in the image with synthetic sub-images, and many other purposes. These image filters can run on the camera, in the cloud (such as cloud computing, for example), or on a desktop computer.

Various exemplary embodiments of the invention use machine learning techniques to learn a mapping from a set of example source images to the image filter parameters required to produce optimal filtered result images. A manual process first adjusts image filter parameters to achieve visually good results on a large set of training images. A machine learning algorithm is run on the data to produce a mapping from image features to parameter values. This algorithm can be run on a desktop computer to provide a mapping that will be "baked into" the device. If the set of training images is large enough and well chosen then the resulting mapping will give comparable results on new images that have not been seen before. This generally describes the process of creating a "smart image correction" algorithm. The process of creating a "learn my custom appearance" algorithm is based on the smart image correction algorithm. A user may take an image either unfiltered or filtered through the smart image correction algorithm. The user subsequently changes values of filter parameters to achieve a desired appearance and then tells the device to learn the new appearance. At this point the machine learning algorithm is run to adapt the existing mapping to take account of the new training examples provided by the user. This learning algorithm may run on the device 10 or in the cloud 50.

A popular machine learning algorithm is Linear Regression. Linear Regression uses planar separatrices to divide a high-dimensional feature space into regions that correspond to different output values. In the case of image processing, one useful feature space is the Y,U,V histograms of the color data. These histograms have 256 bins each (for 8-bit per channel images) and the histogram can be computed fast on the GPU for example by using the OpenCL programming language. Another source of information could come from the mobile device image processing hardware itself, which may compute image statistics including histograms for use in its own internal image processing pipelines. The training regimen involves collecting a set of pre-adjusted images, along with their source images; extracting the image features from the source images; and running the training algorithm to learn a mapping from the image features to the associated image filter parameters. Since the training algorithm is computationally intensive this may be offloaded from the device to the cloud for the purpose of "learn my custom appearance". Computational intensity is not a problem for "smart image correction" since that training does not need to happen on the device.

Figure 4:
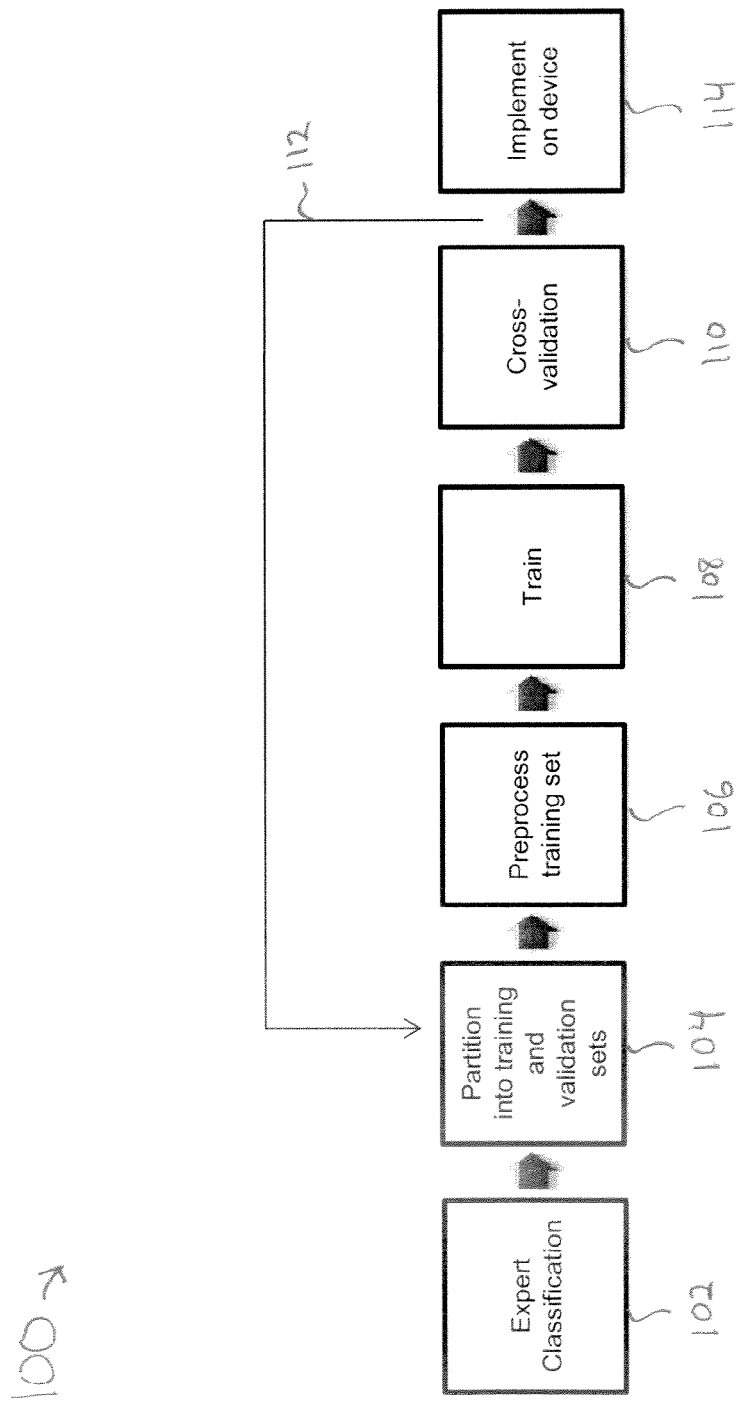
FIG. 4 is a block diagram of an exemplary method of the device shown in FIG. 1.
Figure 5:
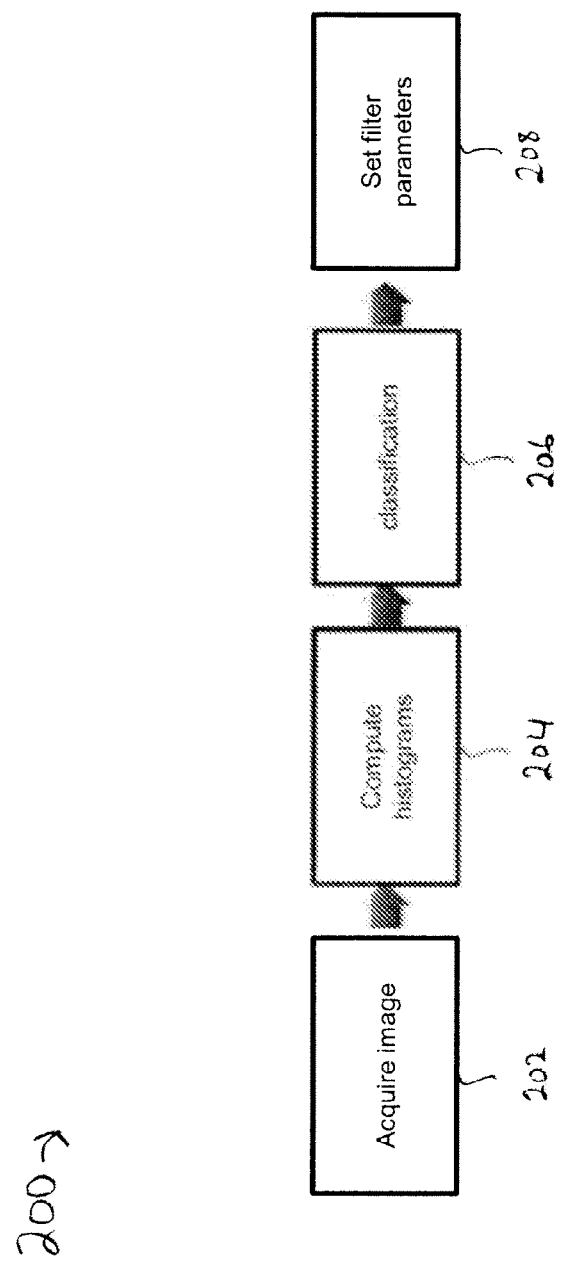
FIG. 5 is a block diagram of another exemplary method of the device shown in FIG. 1.

The implementation generally includes two phases: training, and classification. FIGS. 4 and 5 illustrate the steps involved in each of these phases for "smart image correction". During the training phase the linear regression algorithm processes a set of example images in order to learn the mapping from images to filter parameter values. During the classification stage the algorithm processes a single image in order to provide recommended filter parameter values.

When these phases are used for "learn my custom appearance" the process is slightly different in that the training set is taken from images the user has adjusted manually. The linear regression algorithm is retrained using this training set, this retraining may take place in the cloud rather than on the device. There are no validation sets and therefore no cross-validation. For these purposes it may be useful to train the algorithm to learn a correction to the original classification rather than trying to relearn the classification entirely with the new data. In this approach the trained algorithm is used to classify an image and the resulting error is evaluated. A second classifier is trained to learn to eliminate the error. The complete algorithm then consists of running the original classifier, then the second classifier, and adds the two results together. This combined result matches the behavior of the algorithm as though it were trained on the old and new training examples together.

Referring now to FIG. 4, there is shown an exemplary training phase 100 of smart image correction. The training for smart image correction includes Expert Classification (for example, at block 102) wherein a large set of example images are manually classified by experts. To classify an image an expert views the image in an image manipulation program like Adobe Photoshop while applying a filter to the image and adjusting the filter parameters. When the filter is adjusted to the expert's satisfaction the expert records the parameter settings in a file along with an additional "type" bit to indicate whether the image was a still or extracted from a video.

The training for smart image correction also includes a partition into training and validation sets (for example, at block 104) wherein the set of images is partitioned randomly into ten subsets of equal size. One of these subsets is chosen to be the training set. The remaining nine subsets are called validation sets.

The training for smart image correction also includes a preprocess training set (for example, at block 106) wherein the images in the training set are preprocessed for input to the training algorithm. The Y,U,V histograms for each image are computed. These histograms are normalized and concatenated with each other and with the type bit to form a one-dimensional input vector.

The training for smart image correction also includes a 'training' block (for example, at block 108) wherein the training algorithm is applied to the preprocessed training set in order to learn the mapping from the input vectors to the corresponding filter parameters. The training algorithm uses a regression method such as linear regression to learn a mapping from the training examples to the desired parameter tunings. Depending on the complexity of the training examples it may be desirable to employ more complex regression algorithms such as generalized linear regression or nonlinear regression. A discussion of these algorithms is outside the scope of this disclosure but there is extensive published literate on these methods. See for example "Clever Algorithms: Statistical Machine Learning Recipes" by J. Brownlee.

The training for smart image correction also includes cross-validation (for example, at block 110) wherein the result of the training is cross-validated against the example images that are not in the training set. The classification accuracy of the trained classifiers is tested against the classifications of the experts. If the accuracy of the classifier is below an expected threshold, such as 90% for example, then return to block 104 (see 112).

The training for smart image correction also includes implementation on a device (for example, at block 114) wherein the result of the training step is a model with a set of numeric parameters. This model is implemented on the camera device in software and the parameters are stored in a file for use later in the classification phase.

It should be noted that the illustration of a particular order of the blocks does not necessarily imply that there is a required or preferred order for the blocks and the order and arrangement of the blocks may be varied. Furthermore it may be possible for some blocks to be omitted.

Referring now to FIG. 5, there is shown an exemplary classification phase 200 of smart image correction. The classification phase includes the device acquiring an image from the camera pipeline (for example, at block 202).

The classification phase also includes a 'compute histograms' block (for example, at block 204), wherein software computes histograms of the image Y,U,V channels. In order to work at real time rates this computation may be implemented on the GPU. Source code for an OpenCL implementation of a tile-based GPU histogram algorithm may be provided, for example, in "OpenCL Programming Guide" by Munshi et al.

The classification phase also includes a 'classification' block (for example, at block 206), wherein the histograms are normalized and concatenated along with the type bit to create an input vector. The classification is computed to produce filter parameter values. Note that classification is a very fast operation and happens at real time rates.

The classification phase also includes a 'set filter parameters' block (for example, at block 208), wherein the filter parameter values are applied to the filter in order to produce the desired effect.

It should be noted that the illustration of a particular order of the blocks does not necessarily imply that there is a required or preferred order for the blocks and the order and arrangement of the blocks may be varied. Furthermore it may be possible for some blocks to be omitted.

Figure 6:
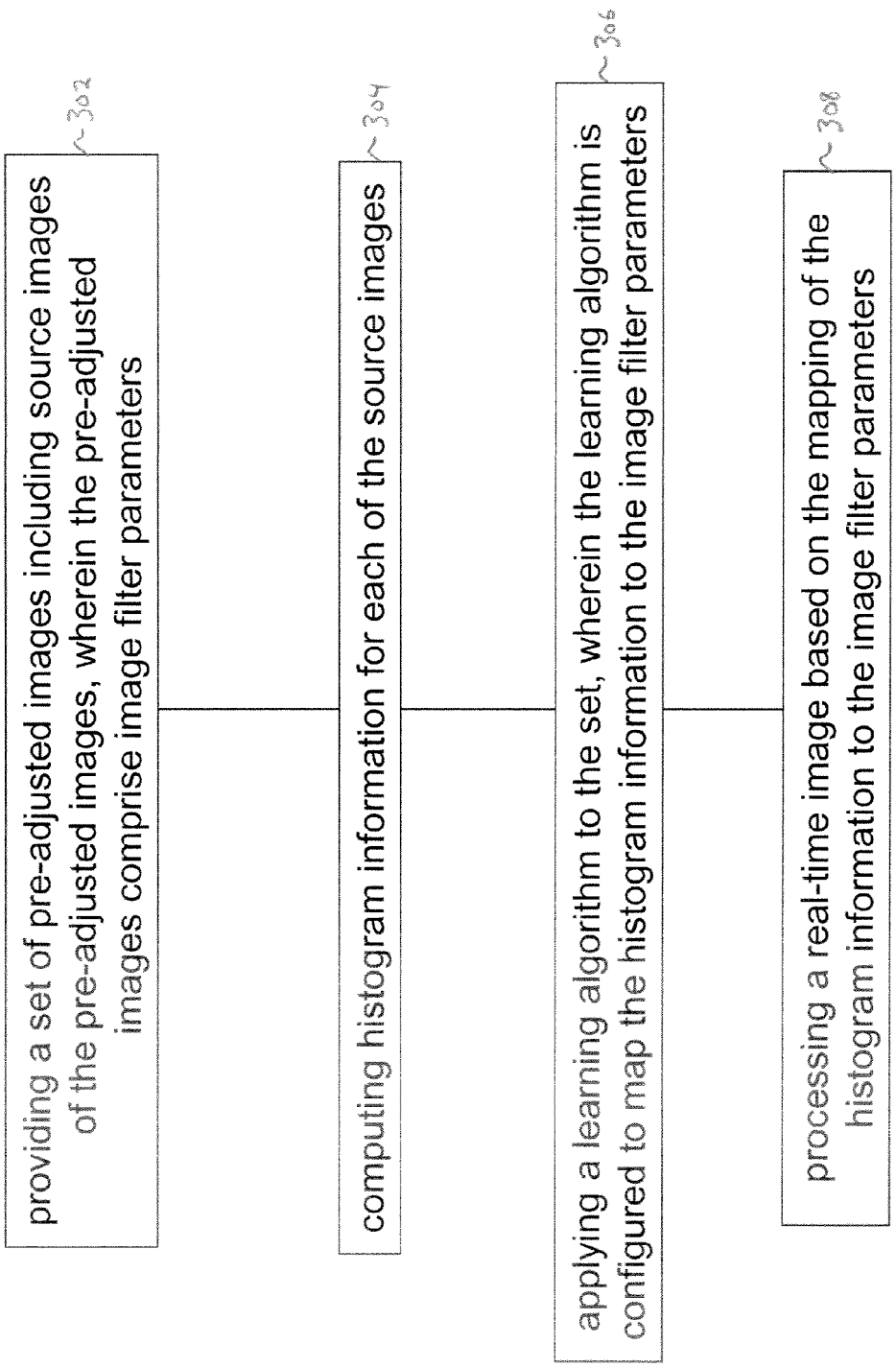
FIG. 6 is a block diagram of another exemplary method of the device shown in FIG. 1.

FIG. 6 illustrates a method 300. The method 300 includes providing a set of pre-adjusted images including source images of the pre-adjusted images, wherein the pre-adjusted images comprise image filter parameters (at block 302). Computing histogram information for each of the source images (at block 304). Applying a learning algorithm to the set, wherein the learning algorithm is configured to map the histogram information to the image filter parameters (at block 306). Processing a real-time image based on the mapping of the histogram information to the image filter parameters (at block 308). It should be noted that the illustration of a particular order of the blocks does not necessarily imply that there is a required or preferred order for the blocks and the order and arrangement of the blocks may be varied. Furthermore it may be possible for some blocks to be omitted.

Technical effects of any one or more of the exemplary embodiments provide an improved automatic image filter when compared to conventional configurations. Many of the conventional image filters are controlled by parameters, for example a brightness filter might have a single scalar parameter called "brightness" that determines how much to brighten the picture. These parameters generally have a value that makes the image filter function as an identity map so that the image filter returns the source image unmodified. Parameter values are usually set manually by visually inspecting the result of applying an image filter to a source image.

Solving this problem would afford at least two new/improved product features for electronic devices (in accordance with various exemplary embodiments of the invention): (1) a "smart image correction" algorithm could apply one or multiple image filters to still images or video to automatically improve image quality without requiring user interaction. Image filters could be applied during capture or as a postprocess; (2) a "learn my custom appearance" feature could allow the user to adjust image filter parameters manually in order to achieve a desired appearance, and then generalize those settings to other images to maintain a consistent appearance without further user intervention.

Additional technical effects of any one or more of the exemplary embodiments provide further improvements over conventional configurations (such as iOS image correction/Auto Enhance, by Apple Inc. of Cupertino, Calif.). Some of the conventional configurations use an algorithm for applying a small set of filters to improve still images. However, the conventional configurations perform a computationally intensive analysis of the image and can take seconds of elapsed time. Thus, the conventional configurations are too slow to run real time and therefore are not applied to videos.

Without in any way limiting the scope, interpretation, or application of the claims appearing below, a technical effect of one or more of the example embodiments disclosed herein is correcting an image at real time rates, which makes it applicable to video as well as still processing. Once a classifier is trained the cost to compute the mapping from input to output is negligible, and may be dominated by the time to construct the input feature set for each image.

Hardware support in the device internal image processing pipeline may be used to mitigate this cost, and a device like the GPU may be used to compute image histograms at real time rates. Another technical effect of one or more of the example embodiments disclosed herein is providing a novel "learn my custom appearance" feature that allows a device owner to custom the look and feel of the still image and videos they take with the device.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

Embodiments of the present invention may be implemented in software, hardware, application logic or a combination of software, hardware and application logic. The software, application logic and/or hardware may reside on the electronic device, on a server or the cloud, or any other suitable location. If desired, part of the software, application logic and/or hardware may reside on the device, and part of the software, application logic and/or hardware may reside on the server or the cloud. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a method comprising providing a set of pre-adjusted images including source images of the pre-adjusted images, wherein the pre-adjusted images comprise image filter parameters; computing histogram information for each of the source images; applying a learning algorithm to the set, wherein the learning algorithm is configured to map the histogram information to the image filter parameters; and processing a real-time image based on the mapping of the histogram information to the image filter parameters.

A method as above wherein the learning algorithm comprises a support vector machine.

A method as above wherein the histogram information comprises Y,U,V histogram information.

A method as above wherein the pre-adjusted images comprise images manually adjusted by image experts.

A method as above wherein the pre-adjusted images comprise images manually adjusted by an end-user.

In another exemplary embodiment, an apparatus comprising at least one processor; and at least one memory including computer program code, the at least one memory and the computer program code configured to, with the at least one processor, cause the apparatus to perform at least the following: provide a set of pre-adjusted images including source images of the pre-adjusted images, wherein the pre-adjusted images comprise image filter parameters; compute histogram information for each of the source images; apply a learning algorithm to the set, wherein the learning algorithm is configured to map the histogram information to the image filter parameters; and process a real-time image based on the mapping of the histogram information to the image filter parameters.

An apparatus as above wherein the learning algorithm is a machine learning algorithm.

An apparatus as above wherein the real-time image comprises a real-time video image.

An apparatus as above wherein the algorithm is configured to be run on a separate device.

An apparatus as above wherein the histogram information is configured to be computed on a graphics processing unit of the apparatus.

An apparatus as above wherein the apparatus comprises a digital camera device.

An apparatus as above wherein the apparatus comprises a mobile phone.

In another exemplary embodiment, a computer program product comprising a computer-readable medium bearing computer program code embodied therein for use with a computer, the computer program code comprising: code for providing a set of pre-adjusted images including source images of the pre-adjusted images, wherein the pre-adjusted images comprise image filter parameters; code for computing histogram information for each of the source images; code for applying a learning algorithm to the set, wherein the learning algorithm is configured to map the histogram information to the image filter parameters; and code for processing a real-time image based on the mapping of the histogram information to the image filter parameters.

A computer program product as above wherein the computing of the histogram information further comprises normalization and concatenation of the histograms.

A computer program product as above further comprising code for cross-validating a result of the learning algorithm against example images that are not in the set.

A computer program product as above wherein the code for processing comprises computing histograms of the real-time image Y,U,V channels.

A computer program product as above wherein the histograms of the real-time are normalized and concatenated along with the type bit to create an input vector.

A computer program product as above wherein the code for processing further comprises computing a classification to produce filter parameter values.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   providing a set of pre-adjusted images including source images of the pre-adjusted images, wherein the pre-adjusted images comprise image filter parameters;
   computing histogram information for each of the source images, wherein computing the histogram information comprises:
      computing a histogram for each of the source images; and
      normalizing and concatenating the histograms;
   applying a learning algorithm to the set, wherein the learning algorithm is configured to map the histogram information to the image filter parameters; and
   processing a real-time image based on the mapping of the histogram information to the image filter parameters.

2. The method of claim 1 wherein the learning algorithm comprises a support vector machine.

3. The method of claim 1 wherein the histogram information comprises Y,U,V histogram information.

4. The method of claim 1 wherein the pre-adjusted images comprise images manually adjusted by image experts.

5. The method of claim 1 wherein the pre-adjusted images comprise images manually adjusted by an end-user.

6. An apparatus, comprising:
   at least one processor; and
   at least one memory including computer program code, the at least one memory and the computer program code configured to, with the at least one processor, cause the apparatus to perform at least the following:
   provide a set of pre-adjusted images including source images of the pre-adjusted images, wherein the pre-adjusted images comprise image filter parameters;
   compute histogram information for each of the source images, wherein to compute the histogram information, the computer program code is configured to, with the at least one processor, cause the apparatus to:
      compute a histogram for each of the source images; and
      normalize and concatenate the histograms;
   apply a learning algorithm to the set, wherein the learning algorithm is configured to map the histogram information to the image filter parameters; and
   process a real-time image based on the mapping of the histogram information to the image filter parameters.

7. The apparatus of claim 6 wherein the learning algorithm is a machine learning algorithm.

8. The apparatus of claim 6 wherein the real-time image comprises a real-time video image.

9. The apparatus of claim 6 wherein the algorithm is configured to be run on a separate device.

10. The apparatus of claim 6 wherein the histogram information is configured to be computed on a graphics processing unit of the apparatus.

11. The apparatus of claim 6 wherein the apparatus comprises a digital camera device.

12. The apparatus of claim 6 wherein the apparatus comprises a mobile phone.

13. A computer program product comprising a non-transitory computer-readable medium bearing computer program code embodied therein for use with a computer, the computer program code comprising:
   code for providing a set of pre-adjusted images including source images of the pre-adjusted images, wherein the pre-adjusted images comprise image filter parameters;
   code for computing histogram information for each of the source images, wherein computing the histogram information comprises:
      computing a histogram for each of the source images; and
      normalizing and concatenating the histograms;
   code for applying a learning algorithm to the set, wherein the learning algorithm is configured to map the histogram information to the image filter parameters; and
   code for processing a real-time image based on the mapping of the histogram information to the image filter parameters.

14. The computer program product of claim 13 further comprising code for cross-validating a result of the learning algorithm against example images that are not in the set.

15. The computer program product of claim 13 wherein the code for processing comprises computing histograms of the real-time image Y,U,V channels.

16. The computer program product of claim 13 wherein the code for processing further comprises computing a classification to produce filter parameter values.

17. A method, comprising:
   providing a set of pre-adjusted images including source images of the pre-adjusted images, wherein the pre-adjusted images comprise image filter parameters;
   computing histogram information for each of the source images, wherein computing the histogram information comprises:
      computing a histogram for each of the source images; and
      normalizing and concatenating the histograms along with a type bit to create an input vector;
   applying a learning algorithm to the set, wherein the learning algorithm is configured to map the histogram information to the image filter parameters; and
   processing a real-time image based on the mapping of the histogram information to the image filter parameters.

18. An apparatus, comprising:
   at least one processor; and
   at least one memory including computer program code the at least one memory and the computer program code configured to, with the at least one processor, cause the apparatus to perform at least the following:

provide a set of pre-adjusted images including source images of the pre-adjusted images, wherein the pre-adjusted images comprise image filter parameters;

compute histogram information for each of the source images, wherein to compute the histogram information, the computer program code is configured to, with the at least one processor, cause the apparatus to:
   compute a histogram for each of the source images; and
   normalize and concatenate the histograms along with a type bit to create an input vector;

apply a learning algorithm to the set, wherein the learning algorithm is configured to map the histogram information to the image filter parameters; and process a real-time image based on the mapping of the histogram information to the image filter parameters.

19. A computer program product comprising a non-transitory computer-readable medium bearing computer program code embodied therein for use with a computer, the computer program code comprising:

code for providing a set of pre-adjusted images including source images of the pre-adjusted images, wherein the pre-adjusted images comprise image filter parameters;

code for computing histogram information for each of the source images, wherein computing the histogram information comprises:
   computing a histogram for each of the source images; and
   normalizing and concatenating the histograms along with a type bit to create an input vector;

code for applying a learning algorithm to the set, wherein the learning algorithm is configured to map the histogram information to the image filter parameters; and code for processing a real-time image based on the mapping of the histogram information to the image filter parameters.

\* \* \* \* \*